United States Patent
Oyman et al.

(10) Patent No.: US 8,027,301 B2
(45) Date of Patent: Sep. 27, 2011

(54) COOPERATIVE OFDMA AND DISTRIBUTED MIMO RELAYING OVER DENSE WIRELESS NETWORKS

(75) Inventors: Ozgur Oyman, Palo Alto, CA (US); Arogyaswami J. Paulraj, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 908 days.

(21) Appl. No.: 12/011,203

(22) Filed: Jan. 23, 2008

(65) Prior Publication Data

US 2010/0278136 A1 Nov. 4, 2010

Related U.S. Application Data

(60) Provisional application No. 60/897,320, filed on Jan. 24, 2007.

(51) Int. Cl.
*H04W 4/00* (2009.01)

(52) U.S. Cl. .................................................. 370/330

(58) Field of Classification Search .................. 370/238, 370/237, 328, 330, 310, 318, 338, 342, 465, 370/272, 492; 455/69, 506, 7, 16, 522, 11.1
See application file for complete search history.

(56) References Cited

U.S. PATENT DOCUMENTS

| | | | |
|---|---|---|---|
| 7,164,669 B2 | 1/2007 | Li et al. | |
| 7,542,439 B2 * | 6/2009 | Rubin | 370/315 |
| 7,684,337 B2 * | 3/2010 | Mehta et al. | 370/238 |
| 2004/0266339 A1 | 12/2004 | Larsson | |
| 2005/0014193 A1 | 1/2005 | Sharma et al. | |
| 2005/0141593 A1 | 6/2005 | Pasanen et al. | |
| 2006/0120477 A1 | 6/2006 | Shen et al. | |
| 2007/0081502 A1 | 4/2007 | Lee et al. | |
| 2007/0086512 A1 | 4/2007 | Can et al. | |
| 2007/0101015 A1 | 5/2007 | Larsson et al. | |
| 2007/0105508 A1 | 5/2007 | Tong et al. | |
| 2007/0135059 A1 * | 6/2007 | Yomo et al. | 455/69 |
| 2007/0147255 A1 | 6/2007 | Oyman | |
| 2007/0190934 A1 | 8/2007 | Kim et al. | |
| 2007/0211757 A1 | 9/2007 | Oyman | |
| 2007/0230605 A1 | 10/2007 | Osseiran et al. | |

FOREIGN PATENT DOCUMENTS

| | | |
|---|---|---|
| WO | WO 2005/067225 | 7/2005 |
| WO | WO 2007/064249 | 6/2007 |

OTHER PUBLICATIONS

Oyman et al., Power-Bandwidth Tradeoff in Dense Multi-Antenna Relay Networks, IEEE Trans. Wireless Comm. 6(6) Jun. 2007, presented at 39th Conf. Info. Sciences and Systems, Baltimore, MD, Mar. 2005.

* cited by examiner

*Primary Examiner* — Chi Pham
*Assistant Examiner* — Alexander Boakye
(74) *Attorney, Agent, or Firm* — Lumen Patent Firm

(57) ABSTRACT

A method for wireless communication combines OFDMA resource allocation and power control policies with cooperative relaying techniques. The techniques are preferably implemented in a dense wireless network of power-limited mobile devices assisted by mobile relay devices having superior power supplies. Preferably, MIMO beamforming techniques are used to further increase energy efficiency and spectral efficiency beyond the increases provided by ODFMA cooperative relaying.

14 Claims, 3 Drawing Sheets

COOPERATIVE OFDMA AND DISTRIBUTED MIMO RELAYING OVER DENSE WIRELESS NETWORKS

CROSS-REFERENCE TO RELATED APPLICATIONS

This application claims priority from U.S. Provisional Patent Application 60/897,320 filed Jan. 24, 2007, which is incorporated herein by reference.

STATEMENT OF GOVERNMENT SPONSORED SUPPORT

This invention was made with Government support under contract DMS-0354674-001 awarded by NSF and contract N00014-02-1-0088 awarded by ONR. The US Government has certain rights in the invention.

FIELD OF THE INVENTION

The present invention relates generally to wireless data networks. More specifically, it relates to methods for improving wireless data communications in dense wireless networks.

BACKGROUND OF THE INVENTION

A wireless network is a collection of wireless transceivers that communicate over a shared wireless resource in a specified geographic region. Examples are cellular phone networks, wireless local area networks (LANs) and personal area networks (PANs). In the most common networks, a wired base station communicates directly with all the other wireless nodes in the network, without any relaying or cooperation among the nodes. Some wireless networks, however, may use multi-hop relaying in which stationary relay nodes assist mobile nodes by receiving and then retransmitting signals between the base and the mobile nodes. In conventional multi-hop relaying the signal follows a unique linear path through a sequence of one or more intermediate relays, e.g., US 2007/021757. Cooperative relaying, in contrast, takes advantage of spatial diversity by transmitting a signal simultaneously through multiple relays, so the signal takes multiple parallel paths between the source and destination nodes. The destination node receives signals forwarded from multiple relay nodes and combines them with each other (and perhaps also with the direct signal from the source). Typically, the relay nodes in cooperative relaying may also serve as endpoints, so each node acts as both an endpoint for its own communications and a relay for communications of other nodes. Thus, the nodes in the network are cooperating with each other by relaying each other's communications.

It is theoretically expected that cooperative relaying generally should provide some enhanced energy efficiency to wireless networks. However, most cooperative relaying techniques have focused on cellular networks, and specific techniques that provide optimal systems have yet to be fully developed and realized. Cooperative relaying has been combined with specific types of multiplexing techniques such as OFDM. In US 2007/0086512, for example, techniques are presented for assigning different relaying schemes (amplify and forward relaying, decode and forward relaying, and direct transmission without relaying) to different OFDM subchannels to enhance performance. The use of MIMO in such as system is dismissed because it requires a plurality of antennas, increasing hardware complexity and cost. It is also significant to note that the described technique for selecting relaying schemes is not a resource allocation technique for assigning subchannels to specific nodes but rather a technique for assigning a relaying scheme to each subchannel. US 2006/120477 proposes cooperative MIMO communication across base stations, i.e. infrastructure devices, but does not envision mobile client cooperative relaying or resource allocation techniques to conserve mobile device energy. Similarly, US 2005/014193 discusses MIMO relaying techniques with emphasis on infrastructure-based relay stations, but focuses on range extension through MIMO relays. Prior research has also focused on cellular networks.

The increasing demand for higher performance wireless communications, presses existing techniques to their limits. Accordingly, there is a need for new techniques that improve the performance of dense wireless networks and provide other advantages.

SUMMARY OF THE INVENTION

The present invention provides methods for wireless communication that combine OFDMA resource allocation and power control policies with cooperative relaying techniques. The techniques are preferably implemented in a dense wireless network containing mobile, multi-antenna transceivers, i.e., portable, multiple input and multiple output (MIMO) devices which can implement spatial beamforming and coherent antenna array techniques. Advantageously, these techniques result in power savings to increase energy efficiency of the mobile devices in the network.

The novel multiple access scheme of the present invention is herein called cooperative orthogonal frequency-division multiple access (coop-OFDMA). This scheme simultaneously realizes the advantages of OFDMA resource allocation and cooperative relaying. When implemented as distributed multi-user MIMO relaying technique in conjunction with orthogonal frequency division multiple access (OFDMA) resource allocation and client power control policies, the techniques provide the advantage of power savings for battery-limited clients, improving battery life and energy efficiency.

In a preferred embodiment, the dense network is composed of multiple mobile wireless devices which include multi-antenna devices. Mobile devices in the network cooperate with each other by serving as relays for each other's signals. The power-limited mobile nodes are assisted by cooperating nodes with superior power supplies, e.g., laptops assisting battery-limited cell phones over a WiMax uplink network. Implementation environments include IEEE 802.11 Very High Throughput (VHT) systems adapted to use OFDMA for local area networks (LANs) instead of the classical CSMA approaches.

In one aspect, the present invention provides a method for communication in a dense multi-user MIMO wireless data network composed of multiple wireless devices. An OFDMA-based resource allocation is employed over the multi-user MIMO network and mobile devices cooperate with each other over the dense network composed of many wireless (single-antenna and multi-antenna) devices and serve as relays for each other's signals. Significantly, the present approach uses cooperative MIMO communication of client devices and client relaying, and not merely cooperation across base stations, i.e., infrastructure devices.

In one aspect, a method for wireless data communication is provided which includes providing a dense multi-user wireless data network including multiple wireless multiple-input multiple-output (MIMO) mobile devices. The network may also include SIMO, MISO, and SISO devices. The method involves allocating wireless resources on the data network using cooperative orthogonal frequency division multiple access, according to which the mobile devices cooperate with each other and serve as relays for each other's signals.

In another aspect, a method is provided for wireless data communication in a wireless network of wireless communication devices. Preferably, the network is dense network, e.g., a network in which a nearest neighbor separation between devices in the network is less than 50 meters. The devices include a source device, a destination device, and multiple cooperative relay devices. The source device is a mobile device powered by an internal battery, the cooperative relay devices are mobile devices, and the destination device is a stationary device. The method includes allocating to the source device wireless resources comprising OFDMA time-frequency subchannels, adjusting transmit power level at the source device based on channel state information of channels between the source device and the cooperative relay devices, and communicating a signal using cooperative relaying from the source device to the destination device via the multiple cooperative relay devices. The cooperative relay devices receive the signal from the source device and transmit the signal using the wireless resources allocated to the source device. Preferably, the cooperative relay devices comprise a MIMO device, and MIMO beamforming is implemented at the MIMO device to perform the cooperative relaying.

The method may include transmitting channel state information over a pilot channel from the destination device to the cooperative relay devices, and/or transmitting channel state information over a pilot channel from the cooperative relay devices to the source device or from the source device to the cooperative relay devices (the last approach assumes channel reciprocity, i.e., for any given two terminals A and B, at any given time and frequency, the channel from terminal A to terminal B is the same as the channel from terminal B to terminal A). The method may include transmitting quantized channel state information over a feedback channel from the destination device to the cooperative relay devices. The method may also include transmitting quantized channel state information over a feedback channel from the cooperative relay devices to the source device. The method may include transmitting signal-to-interference-and-noise ratio information from the cooperative relay devices to the source device, and using the signal-to-interference-and-noise ratio information to adjust the transmit power level at the source device subject to a predetermined target quality of service level. Preferably, adjusting the transmit power level at the source device includes minimizing the transmit power level subject to a predetermined quality of service level of the channels.

In some embodiments, the signal is communicated using two-hop cooperative relaying from the source device to the destination device via the multiple cooperative relay devices. Wireless resources may be allocated to the source device by allocating a first OFDMA time-frequency subchannel in a first time slot to the source device and allocating a second OFDMA time-frequency subchannel in a second (distinct) time slot to the source device, which is to be used for the cooperative transmissions by the relay devices. In some cases, more than two OFDMA time-frequency subchannels may be allocated to the source device. The transmission over the first hop and second hop may be open loop, i.e., implemented without full channel state information, or closed-loop, i.e. implemented with channel state information.

The method may also include communicating a downlink signal using cooperative relaying from the destination device to the source device via the multiple cooperative relay devices, in which case the cooperative relay devices receive the downlink signal from the destination device and transmit the downlink signal using the wireless resources allocated to the source device.

DETAILED DESCRIPTION

Figure 1:
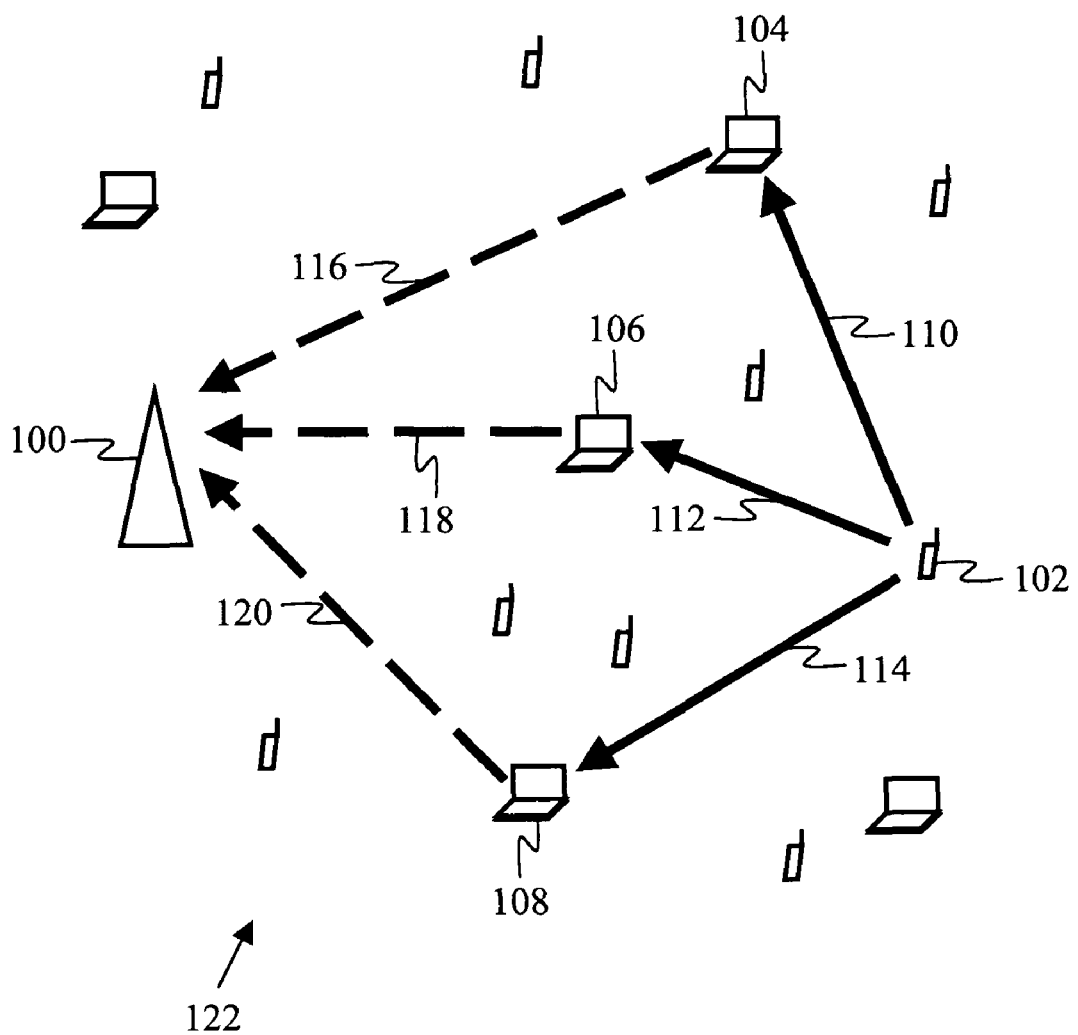
FIG. 1 is a schematic diagram of a wireless communication network using a cooperative relaying technique according to an embodiment of the present invention.

According to one embodiment of the invention, a method for wireless communication is provided for a dense wireless network, i.e., a network in which a majority of pairs of devices in the network have other devices positioned in the space between them, and in which the nearest neighbor separation between devices in the network is less than 50 meters. An example of such a dense network is a local area network or personal area network containing ten or more devices, such as the network 122 shown in FIG. 1. The network 122 contains various mobile wireless devices, such as devices 102, 104, 106, 108, as well as one or more stationary wireless devices, such as device 100. The mobile devices are typically power-limited, e.g., battery-powered devices such as laptops, PDAs, cell phones, or other hand-held devices, while the stationary devices are typically devices with superior power supplies, e.g., wireless LAN access points or desktop computers with wired infrastructure power. The power-limited mobile devices are typically of two types:

those with superior power supplies, e.g., laptops with wireless connectivity, and those with more limited power supplies, e.g., cell phones or other hand-held wireless devices.

In the preferred embodiment, the network communication method implements a cooperative relaying technique in which the mobile devices with superior power supplies assist the mobile devices with more limited power supplies by relaying their signals to and from the stationary device. For example, in FIG. 1 power-limited device 102 communicates a signal to stationary device 100 with the assistance of cooperating devices 104, 106, 108 which preferably have superior power supplies. Specifically, an uplink signal transmitted from source device 102 is intended for destination device 100. The signal propagates from source device 102 along paths 110, 112, 114 to cooperating devices 104, 106, 108, respectively. The cooperating devices receive the signal and relay it by transmitting signals 116, 118, 120 to destination device 100. For simplicity, this example illustrates two-hop cooperative relaying. The method, however, directly generalizes to any number of intermediate hops. The downlink communication also uses cooperative relaying, following the reverse paths as described above. Because the device 100 is not power-limited, however, the downlink alternatively may use conventional direct transmission from the stationary device 100 to the mobile device 102, i.e., not using any other mobile devices for relaying the downlink signal.

The wireless network in the preferred embodiment combines the cooperative relaying described above with orthogonal frequency division multiple access (OFDMA) techniques in a new multiple access scheme called cooperative OFDMA. According to this scheme, wireless resources are orthogonally divided and assigned for device transmissions. In particular, the wireless resource is divided into distinct non-overlapping time slots and distinct non-overlapping frequency bands, producing a collection of orthogonal time-frequency resources which may be allocated to distinct devices in the network. In addition, the OFDMA resources are allocated to the devices to implement cooperative relaying. For example, each device may be assigned a pair of specific frequency-time resources for two-hop cooperative communication of its own uplink signals on the network. One resource of the pair is used in the first hop, while the other resource of the pair is used in the second hop. For example, source device 102 uses one of its allocated resources to transmit its signal along paths 110, 112, 114 to cooperating devices 104, 106, 108, respectively. The cooperating devices receive the signal and relay it by transmitting signals 116, 118, 120 to destination device 100 using the other resource allocated to device 102. Thus, according to the present resource allocation scheme, the cooperating devices use time-frequency resources assigned to device 102 when relaying signals to destination device 100 on behalf of device 102.

In performing their cooperative relaying for device 102, relay devices 104, 106, 108 may use information about their respective forward channels 116, 118, 120 and backward channels 110, 112, 114. For each relay device, its forward channel state information may be obtained through a pilot signal transmission from the stationary device 100, while its backward channel state information may be obtained through a pilot signal transmission from the mobile device 102. Techniques for obtaining channel state information using pilot signals are known in the art, e.g., as described in US 2004/266339. In other embodiments, channel state information may be learned by the relay terminals through explicit feedback mechanisms, e.g. the destination device 100 may estimate the forward channel states and send back the corresponding quantized versions of these channel states to the relay devices 104, 106, 108, which are to be used during the cooperative transmissions over links 116, 118, 120.

In the case where relay devices 104, 106, 108 for device 102 use the same time-frequency resource to transmit a signal to device 100, channel state information may be used to synchronize transmissions 116, 118, 120 so that they arrive together at destination device 100. In some embodiments, the infrastructure device 100 can serve as a reference toward the synchronization of the transmissions 116, 118, 120, i.e., relay devices 104, 106, 108 can first synchronize with device 100, which ensures that transmissions 116, 118, 120 will take place simultaneously at the same time/frequency. Moreover, in some embodiments the transmissions are co-phased based on the reliable knowledge of the channel state information (which will be dependent on precise knowledge of terminal positions and movements as well as random channel realizations) so that they add coherently at destination device 100 to achieve beamforming type gains in a distributed fashion, provided that a desirable level of time/frequency synchronization can be maintained across the relay terminals.

In other cases, the resource allocation method can assign distinct time-frequency resources to each relay 104, 106, 108 involved in forwarding a signal for device 102. In this case, channel state information is not needed for their forward links.

Figure 2A:
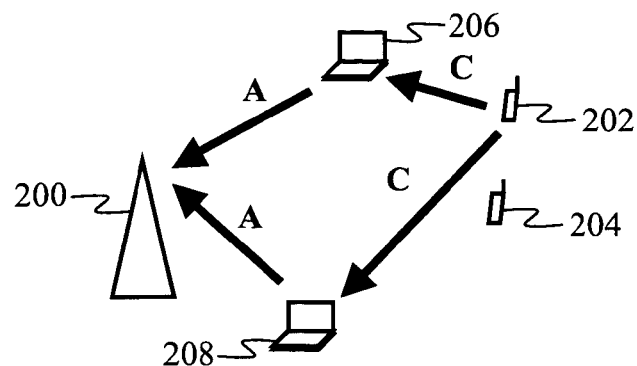
FIGS. 2A-B are schematic diagrams illustrating an example of wireless resource allocation for uplink cooperative relaying from two mobile devices assisted by two relay devices, according to an embodiment of the invention.
Figure 2B:
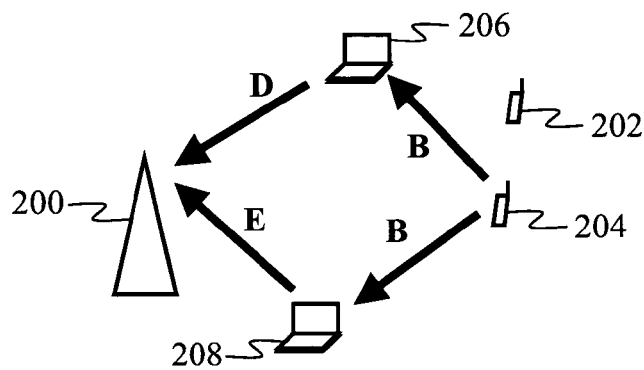
Figure 3:
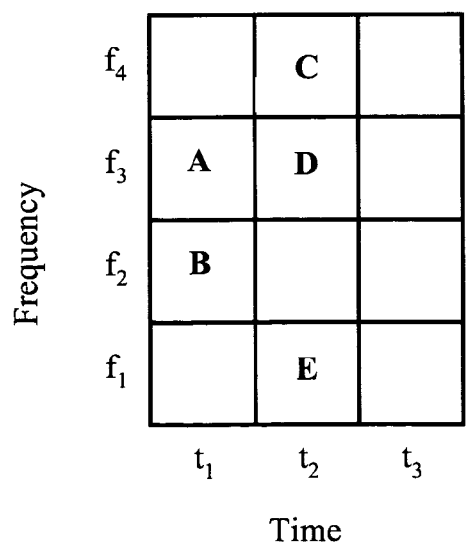
FIG. 3 is a wireless resource allocation scheme associated with the example illustrated in FIGS. 2A-B.

The resource allocation method is illustrated further in the example shown in FIGS. 2A-B and FIG. 3. As shown in FIGS. 2A-B, this wireless network contains stationary device 200, power-limited mobile devices 202, 204, and mobile devices 206, 208 with superior power supplies. In this example, devices 206, 208 serve as relays for devices 202 and 204. For simplicity of illustration, this example shows only two relays 206, 208, and two power-limited devices 202, 204. In general, however, the network typically would contain various other mobile devices. The first-hop links from devices 202, 204 to devices 206, 208 are assumed to be synchronized. Similarly, the second-hop links from devices 206, 208 to device 200 are assumed to be synchronized. The OFDMA resource allocation scheme divides the wireless resource into time-frequency resources as shown in FIG. 3, where each square represents a particular time-frequency resource (subchannel). The cooperative OFDMA resource allocation method then assigns these resources to the devices in the network to implement cooperative relaying. For example, resources A and C are assigned to device 202, while resources B, D, and E are assigned to device 204. Other examples of OFDMA resource allocation can also be given in which spectrum may be reused more aggressively among the first-hop links and second-hop links, in fact this approach may be more desirable from a spectral efficiency performance perspective if we assume half-duplex relaying at devices 206, 208, i.e., the practical constraint that a device cannot hear and transmit at the same time/frequency resource.

In general, the present invention may include various OFDMA-based resource allocation schemes serving cooperative relay links in which power-limited client devices are assisted by client devices with superior power supplies. For two-hop schemes, a given device is assigned to two sub-channels in two different time slots, to be used for the two different hops, assuming half-duplex relaying. In this framework, the sub-channels assigned to a given device may either have two different frequencies or these frequencies may overlap. Other than these specifications, any OFDMA resource allocation scheme and scheduling algorithm may be used toward the allocation of sub-channels for the first-hop and second-hop. Moreover, various algorithms for the selection of relay devices may be used in conjunction with cooperative OFDMA resource allocation.

FIG. 2A illustrates how resources A and C, assigned to device 202, are used in uplink communication from device 202 to device 200. In the first hop, device 202 uses resource C to transmit a signal whose ultimate destination is device 200. The signal on resource C is received by relays 206, 208. These relay devices then retransmit the signal on resource A to device 200 in the second hop. Note that, although resource A is assigned to device 202, other devices may use this resource when relaying signals for device 202. Because the same resource A is used in the second hop by both relay devices 206, 208, they preferably use forward link channel state information to coordinate their transmissions to device 200 (closed loop). If the forward link channel state information is not available in full extent, then relay devices 206, 208 may also use space-time coding techniques toward open-loop cooperative transmissions. Alternatively, if different resources are allocated for the second hop, there is no need for this channel state information. For example, as shown in FIG. 2B, device 204 is assigned resources B, D, and E. In uplink communications from device 204 to device 200, resource B is used in the first hop to transmit a signal from device 204. This signal is received by relay devices 206 and 208, which then retransmit the signal over distinct resources D and E, respectively, to device 200. Because resources D and E are distinct, the second hop can be implemented without full channel state information (open loop).

The cooperative OFDMA technique of the present invention can result in significant power savings, extending battery lifetime of power-limited portable devices in the network. For example, in the two-hop example discussed in relation to FIG. 1 above, the source device 102 need only use sufficient power to transmit its signal to nearby cooperating devices 104, 106, 108. Source device 102 would require significantly more power to transmit its signal directly to destination device 100. Thus, because source device 102 need only use enough power to reach its nearby cooperative relays, it enjoys significant power savings. Although power is also used by the relays 104, 106, 108 in the course of relaying the signal from source 102 to destination 100, there is nevertheless still a net power savings in the network overall as compared to networks using direct transmissions without cooperative relaying. These power savings may be realized by implementing appropriate power control policies. For example, the stationary device 100 can feed back to relay device 104 its measured signal-to-interference-and-noise ratio, and the relay 104 can adjust its transmit power accordingly while maintaining a desired quality of service. Similarly, relay 104 can feed back to mobile device 102 its measured signal-to-interference-and-noise ratio, and the device 102 can adjust its transmit power. Significant power savings can be realized in this manner. In general, any power control policy that takes advantage of the knowledge of channel state information over the cooperative relay links may help to adjust the transmit power at client devices and enhance energy efficiency while achieving a particular target quality of service (QoS) level (e.g., data rate, throughput, error rate, etc.). Such power control policies may be used in conjunction with the cooperative OFDMA resource allocation framework to simultaneously enable higher power-efficiency at the client devices and benefits of cooperative relaying.

Figure 4:
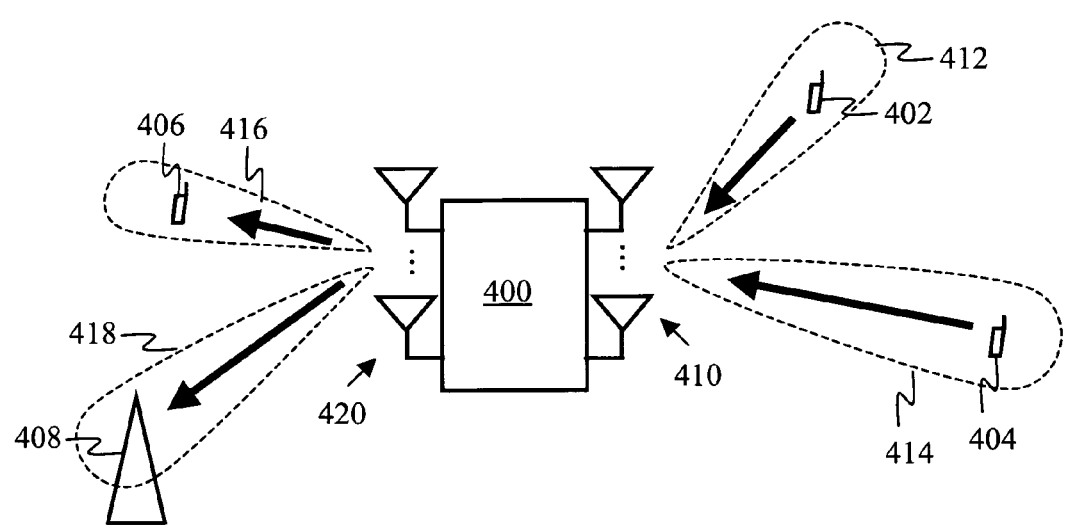
FIG. 4 is a schematic illustration of a MIMO relay device using receive and transmit beamforming to perform cooperative relaying according to an embodiment of the present invention.

In preferred embodiments of the invention, some of the devices in the wireless network have multiple antennas and use single-input multiple-output (SIMO), multiple-input single-output (MISO), and/or multiple-input multiple output (MIMO) techniques to perform transmit and/or receive beamforming and spatial multiplexing. FIG. 4, for example, illustrates a MIMO device 400 serving as a MIMO cooperative relay for other devices in the network. MIMO device 400 has multiple input antennas 410 and multiple output antennas 420. Appropriate channel state information can be sent between communicating devices using pilot signal transmissions, as described earlier. Conventional phased array techniques use these antennas and channel state information to perform transmit and receive beamforming. For example, beams 412 and 414 directed at devices 402 and 404, respectively, are used for receiving signals from these devices. Beams 416 and 418 directed at devices 406 and 408, respectively, are used for transmitting signals to these devices.

The use of beamforming and MIMO relays together with cooperative OFDMA techniques provides significant additional advantages such as reduction of multi-user interference, more robust and reliable communication links, increased array gain, higher power efficiency, and higher spectral efficiency. In particular, multi-user interference during simultaneous transmission by multiple devices on a common subchannel can be substantially reduced or eliminated using appropriate MIMO signal processing techniques such as zero-forcing and linear minimum mean-square error algorithms. Consequently, multiple distinct device pairs can use a common time-frequency resource, providing increased spectral efficiency (as can be seen by comparing FIG. 2A with FIG. 2B). In addition, the improvement in array gain provided by the use of MIMO techniques results in increased signal-to-interference-and-noise ratios, and less required transmit power. Together with the power control policies described above, MIMO techniques thus provide significant additional power savings.

The techniques of the present invention may be adapted for use in various types of network environments. For example, they may be adapted for use in WiMax uplink networks or IEEE 802.11 Very High Throughput (VHT) systems deployed for local area networks (LANs). Those skilled in the art will appreciate that the principles of the invention may also be adapted for use in various other network environments.

The invention claimed is:

1. A method for wireless data communication comprising:
   a) providing a wireless network of wireless communication devices comprising a source device, a destination device, and multiple cooperative relay devices;
   wherein the source device is a mobile device powered by an internal battery, the cooperative relay devices are mobile devices, and the destination device is a stationary device;
   b) allocating to the source device wireless resources comprising OFDMA time-frequency subchannels;
   c) adjusting transmit power level at the source device based on channel state information of channels between the source device and the cooperative relay devices;
   d) communicating a signal using cooperative relaying from the source device to the destination device via the multiple cooperative relay devices; and
   e) transmitting quantized channel state information over a feedback channel from the cooperative relay devices to the source device;
   wherein the cooperative relay devices receive the signal from the source device and transmit the signal using the wireless resources allocated to the source device.

2. The method of claim 1 wherein the cooperative relay devices comprise a MIMO device, and wherein the communicating comprises implementing MIMO beamforming at the MIMO device.

3. The method of claim 1 further comprising transmitting channel state information over a pilot channel from the destination device to the cooperative relay devices.

4. The method of claim 1 further comprising transmitting channel state information over a pilot channel from the cooperative relay devices to the source device.

5. The method of claim 1 further comprising transmitting channel state information over a pilot channel from the source device to the cooperative relay devices.

6. The method of claim 1 further comprising transmitting quantized channel state information over a feedback channel from the destination device to the cooperative relay devices.

7. The method of claim 1 wherein adjusting the transmit power level at the source device comprises minimizing the transmit power level subject to a predetermined quality of service level of the channels.

8. The method of claim 1 wherein a nearest neighbor separation between devices in the network is less than 50 meters.

9. The method of claim 1 wherein communicating the signal using cooperative relaying comprises a two-hop cooperative relaying from the source device to the destination device via the multiple cooperative relay devices.

10. The method of claim 1 wherein allocating wireless resources to the source device comprises allocating more than two OFDMA time-frequency subchannels to the source device, wherein the communicating is implemented without full channel state information.

11. The method of claim 1 wherein allocating wireless resources to the source device comprises allocating more than two OFDMA time-frequency subchannels to the source device, wherein the communicating is implemented with full channel state information.

12. The method of claim 1 further comprising:
f) communicating a downlink signal using cooperative relaying from the destination device to the source device via the multiple cooperative relay devices;
wherein the cooperative relay devices receive the downlink signal from the destination device and transmit the downlink signal using the wireless resources allocated to the source device.

13. A method for wireless data communication comprising:
a) providing a wireless network of wireless communication devices comprising a source device, a destination device, and multiple cooperative relay devices;
wherein the source device is a mobile device powered by an internal battery, the cooperative relay devices are mobile devices, and the destination device is a stationary device;
b) allocating to the source device wireless resources comprising OFDMA time-frequency subchannels;
c) adjusting transmit power level at the source device based on channel state information of channels between the source device and the cooperative relay devices;
d) communicating a signal using cooperative relaying from the source device to the destination device via the multiple cooperative relay devices; and
e) transmitting signal-to-interference-and-noise ratio information from the cooperative relay devices to the source device, and using the signal-to-interference-and-noise ratio information to adjust the transmit power level at the source device subject to a predetermined target quality of service level;
wherein the cooperative relay devices receive the signal from the source device and transmit the signal using the wireless resources allocated to the source device.

14. A method for wireless data communication comprising:
a) providing a wireless network of wireless communication devices comprising a source device, a destination device, and multiple cooperative relay devices;
wherein the source device is a mobile device powered by an internal battery, the cooperative relay devices are mobile devices, and the destination device is a stationary device;
b) allocating to the source device wireless resources comprising OFDMA time-frequency subchannels;
c) adjusting transmit power level at the source device based on channel state information of channels between the source device and the cooperative relay devices; and
d) communicating a signal using cooperative relaying from the source device to the destination device via the multiple cooperative relay devices;
wherein the cooperative relay devices receive the signal from the source device and transmit the signal using the wireless resources allocated to the source device;
wherein allocating wireless resources to the source device comprises allocating a first OFDMA time-frequency subchannel in a first time slot to the source device and allocating a second OFDMA time-frequency subchannel in a second time slot to the source device for cooperative transmission by the relay devices, wherein the first time slot is distinct from the second time slot.

* * * * *